3,291,686
METHODS FOR CONTROLLING MICRO-ORGANISMS
Glentworth Lamb, Trenton, N.J., assignor to American Cyanamid Company, Stamford, Conn., a corporation of Maine
No Drawing. Filed Feb. 21, 1966, Ser. No. 528,781
8 Claims. (Cl. 167—30)

This application is a continuation-in-part of an application, Serial No. 396,385, filed September 14, 1964.

The present invention relates to new fungicidal compositions comprising a dicyanobenzylbenzoate hereinafter defined and has for a principal object methods of protecting agricultural, organic and related articles, such as textiles, paints, plastics and detergents from attack by micro-organisms.

As used in this specification, the term "fungicide" is meant to include not only a material possessing the property of destroying fungi, but also the property of inhibiting the germination of the spores of the fungi.

It is well known that fungitoxicants are usually effective against a variety of specific but limited pathogens. Generally, activity is limited to the control of pathogens which meet a pseudo-classification characterized by disease symptoms. For instance, some fungitoxicants are effective against the causative agents for leaf and stem spots and rots. Others are effective against micro-organisms responsible for leaf blotches, fruit scab or stem cankers and dieback. Still others are effective against mildew. To the present, however, no satisfactory non-phytotoxic, organic fungitoxicant which will effectively control or eliminate both mildew and a variety of other pathogens has been developed. If a broad spectrum fungicide could be provided, a long-felt need would be satisfied.

Unexpectedly, it has been discovered that certain dicyanobenzylbenzoates can be employed to control mildew of both powdery and downy types as well as to control leaf spots, such as cucumber anthracnose. Other causative agents of, for instance, apple scab, tomato late blight, peach brown rot or clover leaf spot similarly can be controlled.

According to the present invention, it has been found that compositions comprising hereinafter defined dicyanobenzylbenzoates in effective amounts possess unique fungicidal and bactericidal properties. Such compositions are particularly effective in preventing and inhibiting fungus growth including mildews on seeds, soils, plants, fruits, cotton and wood.

The contemplated dicyanobenzylbenzoate derivatives employed as the active component in the present invention are represented by the structure:

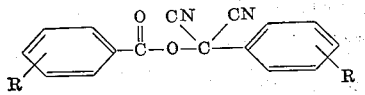

where R is H, (lower)alkyl of from 1 to 4 carbon atoms, such as methyl, ethyl, propyl, butyl, or halo substituent, such as chloro or bromo. The compounds have been prepared by methods well known in the art. For instance, Diels et al. in Berichte, vol. 41, at page 1893 and Popp et al., Journal Chemical Society (London), 1963, at page 1760, disclose typical procedures. Illustrative compounds prepared by these procedures include: dicyanobenzylbenzoate, p-chloro-α,α-dicyanobenzyl p-chlorobenzoate, p-bromo-α,α-dicyanobenzyl p-bromobenzoate, m-chloro-α,α-dicyanobenzyl m-chlorobenozate, m-bromo-α,α-dicyanobenzyl m-bromobenzoate and α,α-dicyano-m-toluoyl m-toluate.

The contemplated broad spectrum fungicidal and bactericidal compositions can be prepared either as a suspension in a suitable non-solvent, as a dust or as a wettable powder. Suspensions or dispersions of the dicyanobenzylbenzoate in a non-solvent, such as water, are advantageously employed in treating plant foliage.

It has been found that for maximum protection of fruits, seeds, plant tubers and other organic materials during storage, it is advantageous to employ a solution of dicyanobenzylbenzoate in oil, which solution is then emulsified in water. The oils that can be used as solvents for the active compound are hydrocarbons, such as for instance benzene and toluene. Halogenated hydrocarbons such as chlorobenzene, chloroform, fluorotrichloromethane and dichlorodifluoromethane are also contemplated.

Alternatively, the aerosol method may be used to apply the compounds of the present invention to foliage. Solutions for the aerosol treatment are prepared either by dissolving the active compound directly in a highly volatile liquid carrier, such as trifluoromethane, or by dissolving the fungicide in a less volatile solvent, such as benzene, and then admixing such solution with the highly volatile liquid aerosol carrier.

Dusts may be prepared by mixing dicyanobenzylbenzoate with dusting materials as, for example, clay, bentonite, pumice, fuller's earth, pyrophyllite and equivalents thereof. Thus, seeds for instance can be protected from soil organisms harmful to them by incorporating the compounds with a solid carrier and admixing the composition with the seed as by tumbling or rotating.

In general, there is employed a wide range of concentrations including minor amounts of active dicyanobenzylbenzoate compound with an inert carrier or diluent, usually from about 0.0001% to about 10% by weight of the compound, based on the weight of the inert additive in major amounts. However, it has been found that for aqueous dispersion preparations from 0.01% to 1.0% of the active ingredient is adequate. For dust compositions, 5% of the active ingredient is effective for most applications.

When an aqueous suspension is utilized, the overall composition may contain a dispersing agent for the compound. In general, any commercial available dispersing or surface active agent can be utilized in forming such dispersions. Illustrative of the dispersions are: the fatty acid esters of polyhydric alcohols, such as "Span," sodium salt of dioctylsulfosuccinate, such as Aerosol OT or the alkylarylpolyether alcohols and equivalents thereof. Usually, from one to five parts of the dispersing agent per 100 parts of the fungicide constitutes a satisfactory range.

The invention will be further illustrated by the following examples, but it is not to be taken as being limited thereto. Unless otherwise specified, the parts given are by weight.

EXAMPLE 1

This example illustrates the preparation of a typical dicyanobenzylbenzoate derivative, namely, m-chloro-α,α-dicyanobenzyl m-chlorobenzoate.

A mixture of 15.8 parts of dry pyridine (0.20 mole) and 9.8 parts (by volume) of hydrogen cyanide (0.25 mole) in a round-bottom three-neck flask equipped with a stirrer, addition funnel, thermometer and reflux condenser is stirred in a cold bath to hold the temperature of the mixture at about 15° C.–20° C. during the addition of 17.5 parts of m-chlorobenzoyl chloride (0.10 mole) over a ten minute period. The reaction mixture is then added to 100 parts (by volume) of dilute hydrochloric acid and is vigorously agitated. Resultant slurry is extracted with methylene chloride and separated. The organic layer is dried and the solvent removed under vacuum. The residue is recrystallized twice from methanol to give 9.2 parts of white crystals having a melting point between 81° C. and 84° C. and analyzing in percent as follows:

Calculated: C, 58.0; H, 2.4; N, 8.5. Found: C, 57.8; H, 2.4; N, 8.3.

In similar fashion, the compounds set forth in Table I below are prepared.

*Table I*

| Compound | Melting Point, °C. | Carbon | | Hydrogen | | Nitrogen | |
|---|---|---|---|---|---|---|---|
| | | Calcd. | Fd. | Calcd. | Fd. | Calcd. | Fd. |
| p-Chloro-α,α-dicyanobenzyl p-chlorobenzoate | 160.5–162 | 58.0 | 58.3 | 2.4 | 2.3 | 8.5 | 8.3 |
| m-Bromo-α,α-dicyanobenzyl m-bromobenzoate | 92–95 | 45.7 | 45.7 | 1.9 | 2.0 | 6.7 | 6.6 |
| α,α-Dicyano-m-toluoyl m-toluate | Low melting solid | 74.5 | 74.3 | 4.9 | 4.9 | 9.6 | 9.6 |
| Dicyanobenzylbenzoate | 95.7 | 73.3 | 72.9 | 3.8 | 3.9 | 10.7 | 10.7 |

EXAMPLE 2

The fungitoxicity of the illustrative dicyanobenzylbenzoate is determined by employing a standard spore germination technique which is as follows: Typical fungi to be tested are: *Monilinia fructicola* (Wint.) Honey and *Stemphylium sarcinaeforme* (Cav.) Wiltshire. A standardized spore (conidia) suspension of each fungus is placed in an aqueous solution of the active compound in a graded concentration series. After an incubation period of 24 hours at 75° F., resultant data are recorded in Table II below as the percent spores that have not germinated.

*Table II*

| Fungus | DCBB* Rate (p.p.m.) | Inhibition of Germination (percent) |
|---|---|---|
| M. fructicola | 100 | 100 |
| | 10 | 100 |
| | 1 | 25 |
| S. sarcinaeforme | 100 | 100 |
| | 10 | 25 |

*DCBB is dicyanobenzylbenzoate.

EXAMPLE 3

The effectiveness of dicyanobenzylbenzoate for controlling plant diseases is illustrated by employing apple scab (caused by *Venturia inaequalis* (Cooke) Wint.) and apple powdery mildew *Podosphaera leucotricha* (Ell. et Everh.) Salm.

Apple seedlings, approximately eight inches tall, are selected for uniformity. Individual plants are hand-sprayed to run-off with graded solutions of dicyanobenzylbenzoate in a mixture consisting of 50 parts of acetone and 50 parts of water. After the spray deposits dry, the plants are uniformly inoculated with the pathogens to be tested. Then inoculated plants are incubated for 96 hours at 70° F. and 100% R.H. Plants are then removed and stored in a greenhouse. Data taken about 14 days after treatment are tabularized in Table III below.

*Table III*

| | Conc'n. (lbs./100 gal.) | Disease Incidence* | |
|---|---|---|---|
| | | Scab | Mildew |
| Dicyanobenzylbenzoate | 1 | 5 | 5 |
| | 0.5 | 5 | 5 |
| Acetone/water mixture (Control) | | 1 | 1 |

*Disease incidence:
5=perfect control, no disease on treated foliage;
4=trace disease;
3=slight disease;
2=moderate disease;
1=severe disease, no disease control.

EXAMPLE 4

The effectiveness of formulated and unformulated dicyanobenzylbenzoate as a control for plant diseases is illustrated by using cucumber anthracnose [caused by *Colletotrichum lagenarium* (Pass.) Ell. et Halst.] and tomato late blight [caused by *Phytophthora infestans* (Mont.) DBy.].

Cucumber seedlings with two leaves expanded and tomato seedlings that are 5 inches to 6 inches tall are sprayed to run-off with graded solutions or suspensions of dicyanobenzylbenzoate. Maneb, i.e., manganous ethylenebis dithiocarbamate, is included in the test as a standard treatment. After spray deposits dry, the plants are uniformly inoculated with the pathogens to be tested. Inoculated plants are then incubated for 48 hours at 62° F. and 100% R.H. The results are tabularized below.

*Table IV*

| Treatment | Rate (p.p.m.) | Disease Control Index [4] | |
|---|---|---|---|
| | | Cucumber Anthracnose | Tomato Late Blight |
| Wettable Powder [1] | 500 | 5 | 4 |
| | 100 | 5 | 4 |
| | 50 | 5 | 4 |
| | 25 | 5 | 4 |
| Liquid Concentrate [2] | 500 | 5 | 4 |
| | 100 | 5 | 4 |
| | 50 | 5 | 4 |
| | 25 | 4 | 4 |
| Active Compound:[3] | | | |
| (1) Dicyanobenzylbenzoate | 500 | 5 | 4 |
| | 100 | 5 | 4 |
| | 50 | 4 | 3 |
| | 25 | 3 | 2 |
| (2) p-Chloro-α,α-dicyanobenzyl p-chlorobenzoate | 500 | 2 | 0 |
| | 100 | 0 | 0 |
| (3) m-Bromo-α,α-dicyanobenzyl m-bromobenzoate | 500 | 5 | 4 |
| | 100 | 4 | 2 |
| (4) α,α-Dicyano-m-toluoyl m-toluate | 500 | 5 | 5 |
| | 100 | 5 | 5 |
| (5) m-Chloro-α,α-dicyanobenzyl m-chlorobenzoate | 500 | 5 | 5 |
| | 100 | 5 | 5 |

[1] Air milled 50% Wettable Powder: 50% DCBB*; 49% Kaolinite; 1% Aerosol OT (sodium salt of dioctylsulfosuccinate).
[2] Liquid Concentrate: 23% DCBB* (equivalent to 2 lbs./gal.); 50% N-methyl-2-pyrrolidone; 21% Panasol AN-3 (high boiling aromatic hydrocarbon; trademark of Amoco Chemical Co. of Chicago, Ill.); 6% Toximul R (anionic-nonionic blend of calcium dodecylbenzenesulfonate and ethoxylatedalkylphenol; trademark of Stepan Chemical Co. of Chicago, Ill.).
[3] In 50% acetone=50% water solution.
[4] Disease Control Index: 5=Equal to or superior to maneb at the rate of 100 p.p.m.; 4=Equal to or superior to maneb at the rate of 50 p.p.m., but not as good as maneb at the rate of 100 p.p.m.; 3=Moderate disease control, not as good as maneb at the rate of 50 p.p.m.; 2=Slight disease control; 1=No significant disease control.

*DCBB is dicyanobenzylbenzoate.

EXAMPLE 5

Dicyanobenzylbenzoate's safety on desirable plants is determined by applying varying concentrations of the active compound on tomato and cucumber plants. Even at rates of 4 pounds in 100 gallons of spray (4800 p.p.m.), no injury is noted during daily observations for three weeks after treatment.

EXAMPLE 6

The antibacterial activity of dicyanobenzlbenzoate is determined employing a standard broth dilution technique.

Test organisms are: *Pseudomonas aeruginosa* (Schroeter) Migula, *Salmonella gallinarum* (Klein) Bergey and *Staphylococcus pyogenes aureus* Rosenbach. A standardized bacterial suspension is mixed with graded concentrations of dicyanobenzylbenzoate in a nutrient solution and incubated for 48 hours at 86° F. Results are recorded in Table V below as growth or no growth indicating the activity or effectiveness of dicyanobenzylbenzoate.

*Table V*

| Test Bacterium | Activity [1] | | | |
| --- | --- | --- | --- | --- |
| | DCBB* Conc. in p.p.m. | | | |
| | 1,000 | 500 | 250 | 125 |
| P. aeruginosa | + | 0 | 0 | 0 |
| S. gallinarum | + | + | 0 | 0 |
| S. pyogenes aureus | + | + | + | + |

[1] Inactive=0. Active=+.
*DCBB is dicyanobenzylbenzoate.

I claim:
1. A method of controlling micro-organisms comprising the step of applying to an area to be protected from said micro-organism an effective amount of a dicyanobenzylbenzoate having the structure:

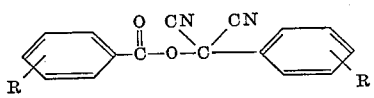

where R is a susbstituent selected from the group consisting of (lower)alkyl, halo and hydrogen.

2. A method of controlling fungi on plants and plant parts comprising the step of applying to said plants and plant parts an effective fungicidal amount of dicyanobenzylbenzoate of claim 1.

3. A method according to claim 2 wherein the effective compound is dicyanobenzylbenzoate.

4. A method according to claim 2 wherein the effective compound is p-chloro-α,α-dicyanobenzyl p-chlorobenzoate.

5. A method according to claim 2 wherein the effective compound is p-bromo-α,α-dicyanobenzyl p-bromobenzoate.

6. A method according to claim 2 wherein the effective compound is a m-chloro-α,α-dicyanobenzyl m-chlorobenzoate.

7. A method according to claim 2 wherein the effective compound is m-bromo-α,α-dicyanobenzyl m-bromobenzoate.

8. A method according to claim 2 wherein the effective compound is α,α-dicyano-m-toluoyl m-toluate.

References Cited by the Examiner

Diels et al.: "Uber Bis-benzoylcyanid," Berichte Deutsche Chemische Gesellschaft 41: 1893–1901 (1908).

Marvel et al.: "Benzoyl Cyanide Dimer and the Addition of Benzoyl Cyanide to Aromatic Aldehydes," J. Am. Chem. Soc. 71: 34 to 36, January 1949.

LEWIS GOTTS, *Primary Examiner.*

SHEP K. ROSE, *Assistant Examiner.*